Mar. 6, 1923.

H. SCHAECHTERLE.
COLLAPSIBLE RIM LOCK.
FILED NOV. 22, 1920.

1,447,894.

Inventor
Henry Schaechterle,

By
Geo. P. Kimmel, Attorney

Patented Mar. 6, 1923.

1,447,894

UNITED STATES PATENT OFFICE.

HENRY SCHAECHTERLE, OF FRIEND, NEBRASKA.

COLLAPSIBLE RIM LOCK.

Application filed November 22, 1920. Serial No. 425,703.

*To all whom it may concern:*

Be it known that I, HENRY SCHAECHTERLE, a citizen of the United States, residing at Friend, in the county of Saline and State of Nebraska, have invented certain new and useful Improvements in a Collapsible Rim Lock, of which the following is a specification.

This invention relates to collapsible demountable wheel rims and more particularly to locks therefor, and is designed as an improvement on the rim disclosed in my application Serial Number 403,494, filed August 14, 1920.

The object of the invention is to provide a lock for a rim of this character so constructed that when secured in operative position thereby the rim will be permitted to expand sufficiently when the securing wedges are forced in tight to closely fit the band used in connection therewith so that the band and rim will form a substantially unitary solid structure when the rim is in use.

Another object is to provide such a lock constructed to relieve the rim section hinges of all strain when the rim is in use.

With these and other objects in view, the invention consists in certain novel features of construction as hereinafter shown and described and specifically pointed out in the claims.

Figure 1:
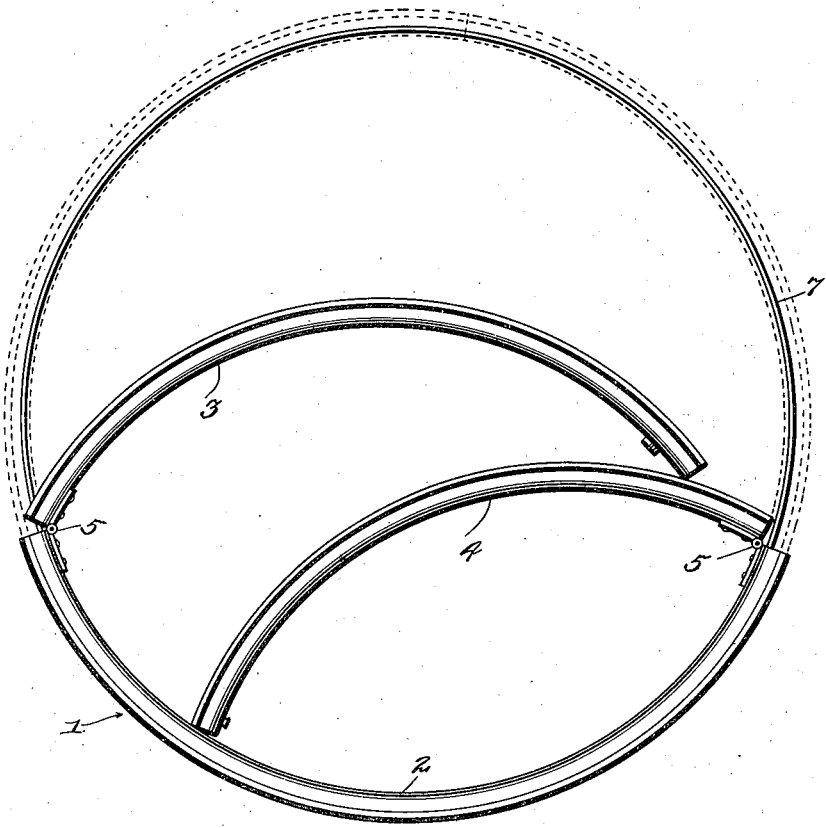
Figure 1 represents a side elevation of a rim equipped with this invention, the sections of said rim being shown in collapsed position in full lines and in open operative position in dotted lines.
Figure 2:
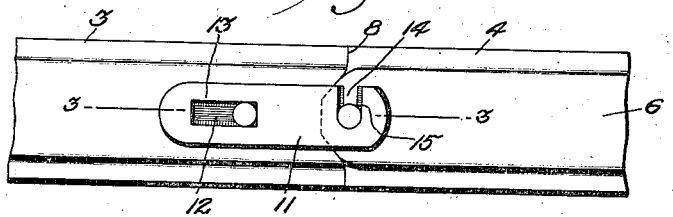
Fig. 2 is an enlarged detail plan view taken from the inner face of the rim showing the lock applied; and, Fig. 3 is a detail longitudinal section taken on the line 3—3 of Fig. 2.

In the embodiment illustrated a collapsible sectional rim 1 is shown composed of a plurality of hingedly connected sections three of which are here shown indicated by the numerals 2, 3 and 4. The sections 3 and 4 are connected with section 2 by hinges shown at 5 and their free ends are constructed for interlocking engagement as shown at 8 in Fig. 2. This rim is made channel shaped in cross section to form a seat 6 in the perimeter thereof for the reception of a band 7 which is designed as a protector for the inner tube of the tire and as a reinforce for the rim. This band 7 is constructed of sheet steel about three sixteenths of an inch in thickness and is of a size to fit the inner perimeter of the shoe in connection with which the rim is to be used and closes the opening in said shoe through which the inner tube is inserted preventing all possibility of the tube being pinched or worn.

Figure 3:
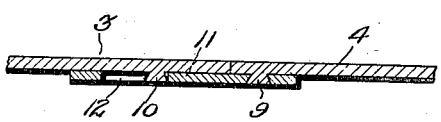

The free end of section 4 is equipped with a radially projecting headed stud 9 which is undercut for a purpose presently to be described. The free end of section 3 is also provided with a similar stud 10 spaced from its terminal a distance slightly greater than stud 9 and which is designed to enter a longitudinally extending slot 12 formed in one end of a latch 11. The side walls of this slot 12 are bevelled as shown at 13 to slidably engage the undercut head of stud 10 and hold the latch connected with the tire section and yet permit it to move longitudinally thereon. The free end of this latch 11 which is designed to overlap the meeting end of section 4 has a laterally opening notch 14 in one side edge thereof the walls of which are bevelled as shown at 15 for engagement with the undercut head of stud 9 as is shown clearly in Figs. 2 and 3 whereby the meeting ends of said sections 3 and 4 are held connected to permit the insertion of the connecting wedges (not shown).

The pin and slot connection between latch 11 and section 3 provides for the expansion of rim 1 when the securing wedges are forced in between it and the felloe of the wheel thereby causing said rim to closely contact with the band 7 and form a substantially unitary solid structure so that the strain will be borne by the sections and the band and the hinges relieved from such strain.

The preferred embodiment of the invention is disclosed in the drawings and set forth in the specification, but it will be understood that any modifications within the scope of the claimed invention may be made in the construction without departing from the principle of the invention or sacrificing any of its advantages.

What is claimed is:

1. A transversely split wheel rim having meeting ends equipped, one with an undercut headed stud and the other with a longitudinally slidable latch provided in one side edge with a transversely arranged notch to engage said stud, the walls of said notch being beveled to fit under the head of the stud.

2. A demountable wheel rim having a plurality of sections of which certain ones are hinged at the rim to the remaining elements with the hinge elements capable of abutting circumferentially, and a latch for spanning the abutting ends, the latch being provided with undercut slots, one extending transversely of the latch and open at one end and the other extending longitudinally of the latch in spaced relation to the first slot, and the adjacent ends of the hinged sections where meeting having undercut headed studs to enter the respective slots.

3. A demountable wheel rim having a plurality of sections of which certain ones are hinged at the rim to the remaining elements with the hinge elements capable of abutting circumferentially, and a latch for spanning the abutting ends, the latch being provided with undercut slots, one extending transversely of the latch and open at one end and the other extending longitudinally of the latch in spaced relation to the first slot, and the adjacent ends of the hinged sections where meeting having undercut headed studs to enter the respective slots, said undercut slots being located in right angular relation and spaced relation one to the other.

In testimony whereof, I affix my signature hereto.

HENRY SCHAECHTERLE.